(No Model.)
E. H. FISH.
ENGINE LATHE.
No. 598,143. Patented Feb. 1, 1898.
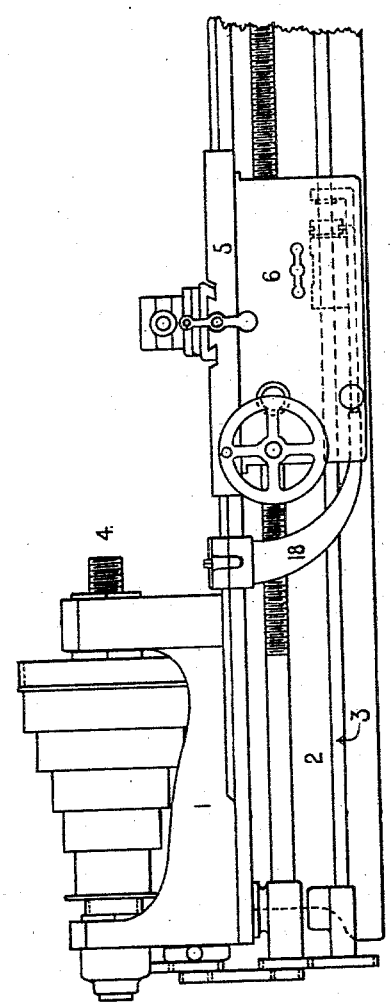
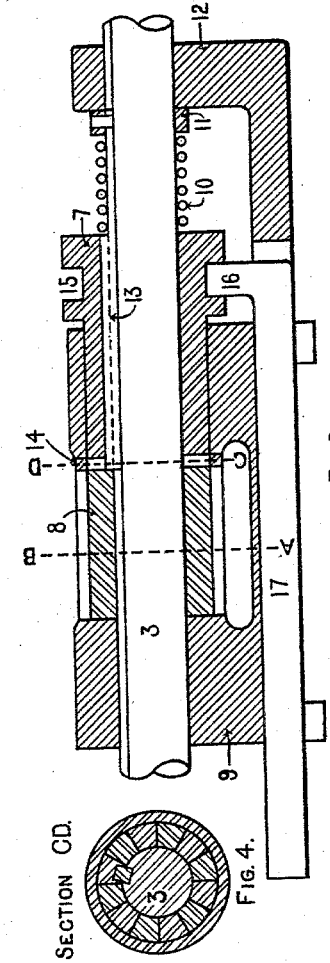
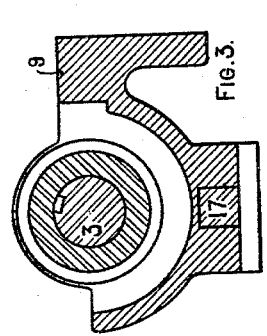
WITNESSES
Henry C. Fish
Charles E. Morey.
INVENTOR.
Elmer H. Fish.

UNITED STATES PATENT OFFICE.

ELMER H. FISH, OF WORCESTER, MASSACHUSETTS.

ENGINE-LATHE.

SPECIFICATION forming part of Letters Patent No. 598,143, dated February 1, 1898.

Application filed March 12, 1897. Serial No. 627,200. (No model.)

*To all whom it may concern:*

Be it known that I, ELMER H. FISH, a citizen of the United States, residing at Worcester, in the county of Worcester and State of Massachusetts, have invented a new and useful Improvement in Engine-Lathes, of which the following is a specification.

My invention relates to an improved form of mechanism for automatically arresting the automatic feeding motion of the rest-carriage along the bed or shears of the lathe, and is applicable to any form of lathe in which a splined shaft journaled in bearings parallel to the shears of the lathe forms a part of the mechanism for transmitting the feeding motion to the rest-carriage.

The objects of my invention are, first, to provide means for automatically stopping the feeding movement of the rest-carriage of the lathe at a predetermined point in its travel, and, second, to provide means whereby when said rest-carriage shall have been moved away from the point where it has been automatically stopped it shall reset itself automatically ready to feed up to the point of stopping again. I attain these objects by the mechanism illustrated in the accompanying drawings, in which—

Figure 1 shows the mechanism in connection with so much of the lathe as is necessary to show how it is applied. Fig. 2 is a section parallel to the shears of the lathe of the portion of this mechanism which is attached to the rest-carriage. Fig. 3 is a section at right angles with the feed-rod (on line A B, Fig. 2) through the worm or gear which drives the feed mechanism of the rest-carriage. Fig. 4 is a section on line C D, Fig. 2, through clutch-teeth formed on the adjacent ends of the worm or gear 8 and clutch-piece 7.

Bed-plate 2, head-stock 1, and feed-rod 3 with the mechanism for driving said feed-rod by trains of gearing or belt connection from the main spindle 4 of the lathe, and rest-carriage 5, with apron 6 attached, are of ordinary construction and are not claimed as any part of this invention. Feed-rod 3 carries upon it clutch-piece 7, having spline connection therewith. Clutch-piece 7 is also journaled in casting 9, which is fastened in turn to the apron 6, attached to the rest-carriage 5. Clutch-piece 7 is held longitudinally relative to the rest-carriage by abutting against the worm or gear 8, and in the other direction by the spring 10, which in turn abuts against a washer 11, which turns with feed-rod 3 and bears against bearing 12, integral with casting 9. Spline 13, which forms the connection between clutch-piece 7 and feed-rod 3, is extended through to collar 11, to which it is rigidly attached and which prevents its movement in that direction relative to the rest-carriage. End 14 of clutch-piece 7 is formed into clutch-teeth. (Shown in section in Fig. 4.) These clutch-teeth engage with mating clutch-teeth formed on the adjacent end of worm or gear 8. Said worm or gear 8 has no direct connection with shaft 3, but is free to rotate on said shaft except for connection through the medium of clutch-piece 7, and is held from movement longitudinally relative to the rest-carriage by casting 9. It will be understood that the form of worm or gear 8 other than as above described is immaterial to this invention.

It will be evident that when clutch-piece 7 is in the position shown it will drive worm 8 by means of clutch-teeth 14, thereby feeding the rest-carriage along the bed by the usual mechanism contained in the apron, and that when clutch-piece 7 is moved in the direction of bearing 12 sufficiently to clear the clutch-teeth the worm or gear 8 will be allowed to stand still and the rest-carriage will be allowed to stop. It will also be evident that when clutch-piece 7 is released spring 10 will force the clutch-teeth back into mesh and renew the connection between rod 3 and worm or gear 8.

Clutch-piece 7 is formed with an annular groove 15, in which runs a projection 16, formed on rod 17. Rod 17 is carried in bearings in casting 9 parallel to the shears of the lathe and is held longitudinally by projection 16 in groove 15. Rod 17 projects sufficiently beyond casting 9 to strike against a stop-piece 18, fastened to the bed or shears of the lathe and capable of being fastened to the bed of the lathe at predetermined points.

When carriage 5 feeds toward stop-piece 18 sufficiently for rod 17 to come in contact with said stop-piece, rod 17 will move clutch-piece 7 (relative to the rest-carriage) sufficiently to release the clutch-teeth 14, and consequently stop the feeding movement of the rest-carriage. When carriage 5 is moved by hand or otherwise in the opposite direction, that pressure on rod 17 will be removed and clutch-piece 7 will be forced back into its original place by spring 10, carrying rod 17 with it ready to be thrown out again when rod 17 comes next in contact with stop-piece 18.

What I claim as my invention, and desire to secure by Letters Patent, is—

1. In an engine-lathe, the combination of a splined feed-rod journaled in bearings parallel to the shears of the lathe: a clutch-piece splined on said rod and capable of limited movement longitudinally relative to the rest-carriage: a worm or gear journaled upon said feed-rod adjacent to said clutch-piece and said worm or gear forming a part of the usual feed mechanism of the rest-carriage: mating clutch-teeth formed upon the adjacent ends of said clutch-piece and said worm or gear: an annular groove in said clutch-piece and a rod or bar held in bearings fastened to the rest-carriage parallel to the bed or shears of the lathe, having a projection entering said annular groove: a stop-piece attached to the bed or shears of the lathe, so situated that said rod or bar shall strike upon it when the rest-carriage is moved sufficiently upon the bed or shears of the lathe: and a spring abutting against said clutch-piece and against a bearing attached to the apron fastened to the rest-carriage, tending to prevent the separation of said clutch-piece and said worm or gear, substantially as described.

2. In an engine-lathe, the combination of a splined feed-rod journaled in bearings parallel to the shears of the lathe: a clutch-piece splined on said rod and capable of limited movement longitudinally relative to the rest-carriage, the spline on said rod being held from longitudinal movement relative to said rest-carriage in one or both directions: a worm or gear journaled upon said feed-rod adjacent to said clutch-piece and said worm or gear forming a part of the usual feed mechanism of the rest-carriage: and mating clutch-teeth formed upon the adjacent ends of said clutch-piece and said worm or gear, substantially as described.

ELMER H. FISH.

Witnesses:
HENRY C. FISH,
CHARLES E. MOREY.